March 14, 1961  R. A. MUELLER  2,975,396
ARTIFICIAL SONAR TARGET
Filed June 23, 1950  2 Sheets-Sheet 1
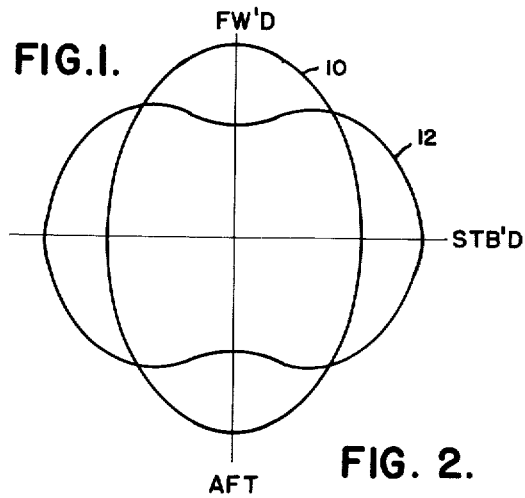
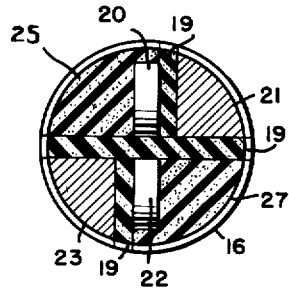
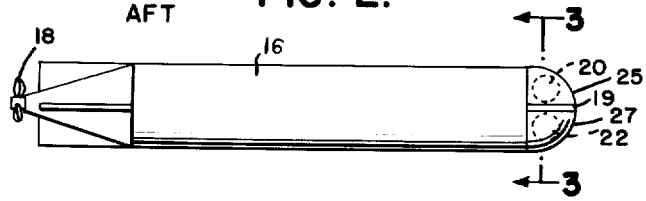
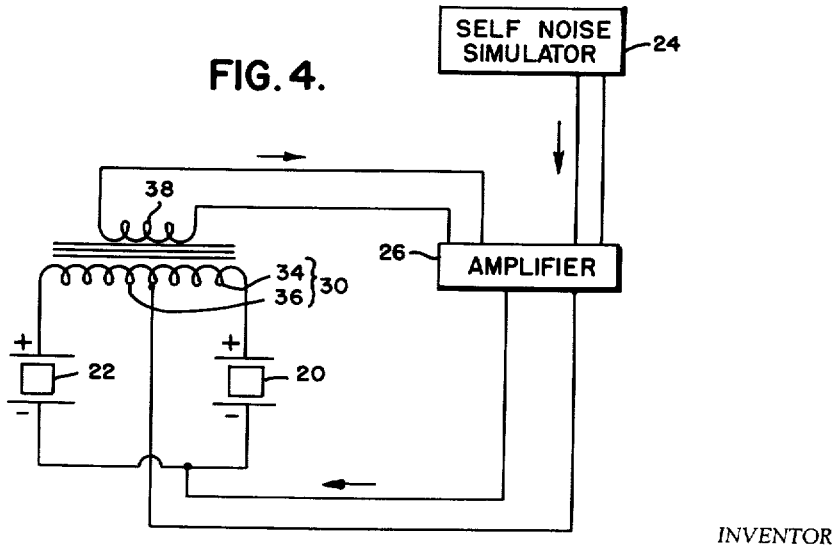
INVENTOR
RICHARD A. MUELLER
BY
ATTORNEYS

INVENTOR
RICHARD A. MUELLER

United States Patent Office 2,975,396
Patented Mar. 14, 1961

2,975,396

ARTIFICIAL SONAR TARGET

Richard A. Mueller, San Diego, Calif., assignor to the United States of America as represented by the Secretary of the Navy Filed June 23, 1950, Ser. No. 169,955

8 Claims. (Cl. 340—5)

(Granted under Title 35, U.S. Code (1952), sec. 266)

This invention relates to artificial sonar targets for confusing search by sonar, and more particularly to means for presenting to the searching force a false target having improved means for simulating a submarine sonic output of both self-noise and echoes returned.

Various means are practiced for finding submarines by sonic apparatus, including use of receiving devices adapted to detect and reproduce the various sounds made by, or reflected from, a submarine running in a submerged condition, and devices for obtaining the range of a submerged submarine by transmitting signals which are then reflected from the hull of the submarine and received by other devices on the searching craft, with means for determining the distance or range of the submarine by the transit time for the transmitted and received signals. By means of these devices, it is possible to accurately locate and destroy submarines. Various techniques may be devised for avoiding the searching craft, the present invention providing an improvement in the accuracy of submarine sound simulation in an artificial target.

Each of the several types of vessel produces noise due to the operation of machinery characteristic of the vessel and radiated in a pattern of well defined type and by this characteristic noise the attacker is able to concentrate its search on one vessel in the vicinity thereof. Ordinarily it is possible to follow the movements, or to track, only one or two at a time. Since the submarine vessels are not seen, the presence of several targets moving in different paths and directions becomes confusing and prevents prediction of future position. Attack is thus rendered more difficult when several hostile submarines are present and employing evasive action intended specifically to confuse the listeners. This difficulty is especially acute when listening alone is employed to detect submarine self-noise and when the tracked vessel suddenly becomes quiet for an interval of time by shutting down the machinery, thereby causing the searcher to "lose" the object of the search. Echo ranging techniques are used in cooperation with the listening method, to give a more continuous "contact" with the quarry in an effort to overcome the inability to "hear" the silenced target. Furthermore, modern listening techniques may include a rough survey of the directional pattern of the sound output or echoing efficiency of the submarine from fore and aft or beam directions, and previous artificial targets have not shown a sufficiently close approximation of the real target's directional pattern to consistently deceive the searcher.

The foregoing discussion presents in general terms the background into which the present invention introduces an improved technique of evasion. The artificial target, according to the present invention, is more economical to manufacture and presents a sound distribution thereabout more closely simulating that of the submarine in the two components of sound heard by a searcher, the echo and the self-noise.

Each target of submarine simulating type is equipped with signal generating devices and signal receiving and reproducing devices whereby it can produce those sounds characteristic of the parent submarine traveling at a particular speed. The target equipped in this manner is small in size and at the same time produces a signal which appears to the operators of sonic listening apparatus as a full-sized submarine.

An object of the present invention is the provision of new and improved means for simulating the sound output of a submarine operating submerged.

Another object is to provide improved means for simulating the echo produced by a submerged submarine.

A further object of the invention is the provision of improved transducer equipment particularly adapted for reproducing characteristic submarine simulating signals.

A still further object is the provision of improved coupling and amplifying means for producing and projecting sounds corresponding to the echoed and self-produced noises, respectively, observable at a search point near a submarine.

Other objects and features of the invention will become apparent to those skilled in the art as this disclosure is made in the following detailed description of a preferred embodiment of the invention as illustrated in the accompanying sheets of drawings in which:

Fig. 1 is a diagram of the pattern of sounds from a submarine.

Fig. 2 is a schematic diagram of an illustrative target employing the present invention.

Fig. 3 is a sectional view along lines 3—3 of Fig. 2.

Fig. 4 is a schematic wiring diagram of a circuit according to the present invention.

Figure 5:
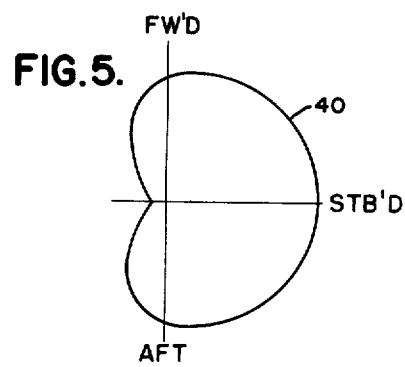
Fig. 5 is a diagram of the horizontal sound output of a transducer such as 20 of Fig. 2.

Referring now to the drawings wherein like numerals refer to like components in the several views, Fig. 1 shows a representative pattern of the intensity of sounds from a submarine in which self-noise, or noise produced in the submarine, is shown in curve 10 as more pronounced at bow and stern aspects than at either beam. The other component of observable noise, namely the reflectivity of the submarine to sounds projected at it from a searching craft, or the echo characteristic, is greatest at the beam aspects.

As shown in Fig. 2 the artificial target includes a body 16, a propeller 18 and a pair of similar electromechanical transducers, or hydrophones, 20 and 22 facing toward the starboard and port sides respectively. The body 16 also carries electric apparatus for driving these transducers. As is shown in Fig. 3, the transducers are mounted one above the other as close together as possible with only a layer of foam rubber 19 between them for acoustic insulation. Foam rubber also insulates them from their metallic supports 21 and 23. They are covered with blocks 25 and 27 of rubber that has approximately the same acoustic properties as water, so as to provide streamlining for the craft while giving the transducers good acoustic coupling with the water.

These transducers are connected in a balanced bridge circuit as shown in Fig. 4. A simulation of the self-noise of a submarine is produced at generator 24 amplified at 26 and applied through primary coil 30 to the two transducers 20 and 22 for broadcasting these sounds in the water. The two halves 34 and 36 of coil 30 are alike, and since the transducers 20 and 22 are similar, the currents in the halves 34 and 36 buck each other and produce no voltage in the secondary coil 38 to which they are magnetically coupled.

When sound signals, equal in both magnitude and phase, are received by the transducers 20 and 22 from the water, they produce equal and opposite effects in the halves 34 and 36 of coil 30 and so fail to produce a voltage in coil 38. When the transducers 20 and 22 receive unequal signals from the water they apply unequal voltages to coil halves 34 and 36 and so produce a voltage in coil 38 that is amplified at 26 and applied to the transducers 20 and 22 equally for sending out a signal much stronger than was received. As before, the output of amplifier 26, though it drives the two transducers 20 and 22, produces no voltage in coil 38. Thus the transducers 20 and 22 may receive signals, retransmit them, and transmit noise from generator 26, all at the same time. The system works because the voltages in coils 34 and 36 are balanced except for incoming signals, and only that unbalance is passed to the amplifier from coil 38, and that unbalance just equals the incoming signal regardless of what the transducers 20 and 22 may be transmitting.

Figure 6:
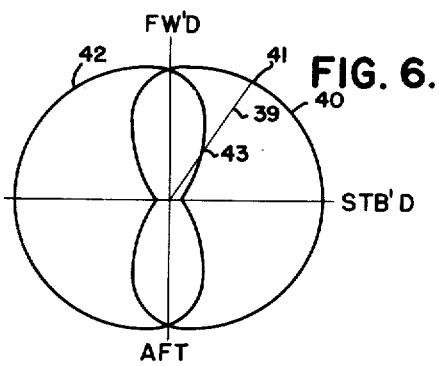
Fig. 6 is a diagram of comparative sound outputs from transducers 20 and 22.

The horizontal intensity pattern 40 for the single transducer 20 is shown in Fig. 5. The patterns for both transducers are shown in Fig. 6. The polarities of the connections to the transducers 20 and 22 are so chosen that sound coming bow-on (from straight ahead) applies opposite voltages to coil 30 as indicated by the plus and minus signs in Fig. 4. Since, for a bow-on signal the two transducers 20 and 22 exhibit equal sensitivities as shown by the curves of Fig. 6, these opposed voltages applied to coil 30 are equal in both magnitude and phase so that no voltage is induced in secondary coil 38. A signal coming from a horizontal direction 30 degrees on the starboard bow (from the direction of line 39 in Fig. 6) also causes transducers 20 and 22 to apply opposed, in-phase voltages to coil 30, but under this condition transducer 20 exhibits the sensitivity represented by point 41 on curve 40, while transducer 22 exhibits the lower sensitivity represented by point 43. Consequently, the system receives signals from this direction (line 39) with a sensitivity equal to the difference of the values represented by points 43 and 41 in Fig. 6. Similarly for other horizontal directions, the system sensitivity for reception of under water sound is obtained by subtracting the curves 40 and 42. The result is the double-lobed curve 44 of Fig. 7.

When driven by the amplifier 26, transducers 20 and 22 are driven equally and in phase so that their effects add. This fact means that the transmission intensity pattern of the system in the horizontal plane is represented by the sum of curves 40 and 42. This sum is shown as curve 46 in Fig. 7.

Figure 7:
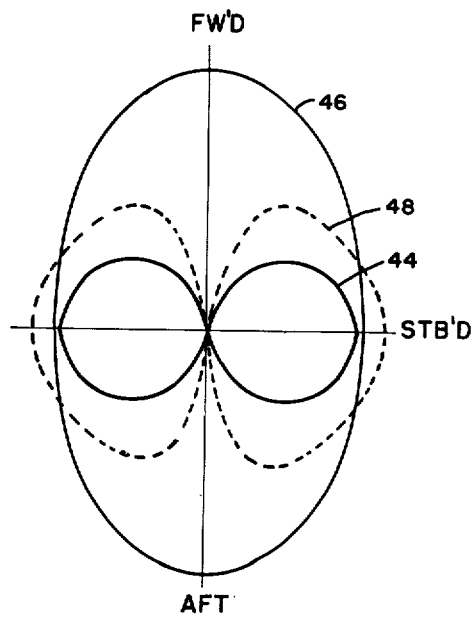
Fig. 7 is a diagram of the combined horizontal outputs of transducers 20 and 22.

Since the return of a simulated echo by the artificial target requires both reception and transmission, the pattern of echo intensities in the horizontal plane depends on the product of curves 44 and 46 and is shown by the double-lobed curve 48 of Fig. 7.

Figure 8:
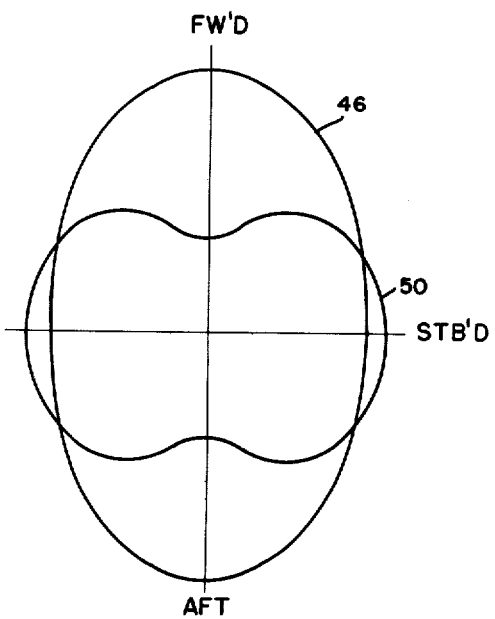
Fig. 8 is a diagram as in Fig. 7 except taken at an angle to the horizontal.

For aspects above and below the horizontal, the curves of Fig. 7 are somewhat different. For example when receiving a signal from a point ahead, but slightly above horizontal, transducer 20 lies slightly nearer the source of sound and so receives it at a different phase than does transducer 22. Under such a condition the two voltages from the transducers can not completely cancel each other and the reception curve does not have a zero value. But at aspects other than bow and stern, slight vertical angles have little effect. Actually, the sonar gear of a surface vessel will usually be nearer the surface than will the target and so will "view" the target from a position above the horizontal plane through the target. The angle above horizontal will of course be slight because the range, or horizontal distance, will usually be very great compared to the depth of the target. Curve 50 in Fig. 8, which is substantially curve 48 with the zero points "rounded off" shows the echo intensity characteristic that will usually be observed.

Thus, the intensity of the transmission of the simulated self-noise from generator 26 will follow pattern 46 which substantially duplicates curve 10. The intensity with which the artificial target returns simulated echoes to the sonar gear of surface craft is shown by curve 50, which satisfactorily simulates curve 12 of Fig. 1.

By use of the single pair of transducers on an artificial target for sending simulated and amplified self-noise patterns of the true target, and at the same time receiving, amplifying and rebroadcasting incoming sounds from the same pair of transducers a greatly improved target simulation is achieved. It resembles the pattern of echoes from a true target and equally well the pattern of self-noise. The resemblance in and out of the horizontal plane is equally good. By so combining the transducers in the circuit disclosed the possibility of discovery that the target is false is greatly reduced. Refined comparisons between the sounds from various aspects, and also the sound patterns between echo and self-noise fail to reveal the false nature of the artificial target according to this invention.

While this invention is described in connection with a mobile target, it is not limited in use thereto and various modifications and variations are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

I claim:

1. In an artificial sonar target for simulating a submarine, means generating a signal corresponding to a desired submarine self-noise characteristic, means amplifying said signal, a pair of transducers connected at one side thereof, respectively, to the output of said amplifier means and angularly arranged to transmit sonic outputs in different directions, a transformer primary connected between said transducers and center-tapped to the output of said amplifier, a secondary for said transformer symmetrical about said center top and connected to an input for said amplifier, whereby similar inputs to said transducers and similar signals therefrom induce negligible signal for amplification and dissimilar outputs from the transducers induce signals to the amplifier for amplified signal simulation of echoes from said target.

2. In an artificial sonar target for simulating a submarine by returning amplified echo signals and producing submarine self-noise signals, a pair of similar transducers parallel connected at one terminal thereof, a submarine self-noise signal source, said transducers being disposed at an angle for sonic transmission in differing directions and connected at said one side to said source, a transformer winding connected at the ends thereof, respectively, to the remaining terminals of said transducers, a connection from the electrical centerpoint of said winding to said source, whereby energization of the transducers from the source induces equal and opposing fields in said winding, a second transformer winding coupled to the first said winding equally about said centerpoint, whereby differing energization of the transducers from the ambient medium induces a signal in the second winding, and means amplifying the last said signal and feeding the amplified signal to said transducers in parallel with said submarine self-noise signal.

3. In a sonic decoy for simulating a submarine including a controlled mobile target body, a transducer housing at the forward end of said body, a pair of transducer elements mounted within said housing and arranged for maximum transmission and reception in opposite directions in a horizontal plane and at right angles to the direction of motion of the body, soft resilient means between said elements and said mountings for sonic insulation therebetween, a streamlined portion of said housing surrounding the active surface of each said element and composed of material resembling the ambient medium in sonic characteristics, whereby the transducer elements are coupled to the medium along the surface of said streamlined portion, means energizing said transducer elements in series connection therethrough for simulating submarine self-noise, and means responsive to the difference in reception by said elements for amplifying and transmitting through said elements a received signal as an augmented simulated echo of said received signal.

4. The decoy of claim 3 wherein the said housing portions comprise cylindrical surface quadrants on port and starboard sides, respectively, of the target body, and said transducer elements in contact therewith face toward the port and starboard beams thereof, respectively, to provide a maximum sound output lobe in each said beam direction.

5. The decoy of claim 4 wherein said housing portions are substantially spherically rounded to form the forward end of the target body for transmission of a strong forward component of sound output from both said transducer elements.

6. The decoy of claim 3 wherein the said transducer elements and the corresponding said housing portions in sonic transmitting contact therewith, respectively, are faced laterally of the length of said target body for receiving signals from said lateral directions with greater sensitivity than signals received from other directions, whereby said augmented signals are transmitted in greater strength than signals received from other directions.

7. In a sonar echo repeating target, a source of noise signal simulating self-noise signals characteristic of a self-propelled submarine body, means amplifying said noise signal, means feeding the amplified signal in the same direction through a pair of spaced transducer elements, a pair of said elements receiving said noise signal and arranged for transmitting the signal in phase from the pair of elements in a forward direction, whereby the transmitted signal has maximum intensity along a line equidistant from the elements, transformer primary means in the circuit between the transducer elements and energized in common with the elements oppositely and equally about a midpoint thereof, transformer secondary means symmetrically coupled to said primary means to receive negligible signal in response to equal energization of the transducer elements and to receive substantial signal from unequal sonic excitation of the elements, and means feeding said substantial signal to said amplifier means, whereby said transducer elements transmit an amplified sonic output in response to said unequal excitation.

8. In a sonic decoy for simulating a submarine including a controlled mobile target body, a transducer housing at the forward end of said body, a pair of transducer elements mounted within said housing and arranged for maximum transmission and reception in opposite directions in a horizontal plane and at right angles to the direction of motion of the body, means energizing said transducer elements in series connection therethrough for simulating submarine self-noise, and means responsive to the difference in reception by said elements for amplifying and transmitting through said elements a received signal as an augmented simulated echo of said received signal.

References Cited in the file of this patent

UNITED STATES PATENTS 2,406,111     Sheffield _____ Aug. 20, 1946